(12) United States Patent
Bisping et al.

(10) Patent No.: US 6,264,413 B1
(45) Date of Patent: Jul. 24, 2001

(54) FASTENING ELEMENT FOR ATTACHING INSULATION BOARDS

(75) Inventors: Heinz Bisping, Augsburg; Thomas Belz, Munich; Wolfgang Hausner, Igling; Erich Daigeler, Waal, all of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/551,340

(22) Filed: Apr. 18, 2000

(30) Foreign Application Priority Data

Apr. 26, 1999 (DE) .............................. 199 18 782

(51) Int. Cl.⁷ .............................. A47G 3/00; F16B 16/06
(52) U.S. Cl. .......................... 411/372.6; 411/15; 411/41; 411/45
(58) Field of Search ..................... 411/429, 431, 411/372.5, 372.6, 373, 377, 15, 44, 41, 45, 965, 999

(56) References Cited

U.S. PATENT DOCUMENTS

| 4,187,757 | * | 2/1980 | Frischmann . |
| 4,214,505 | * | 7/1980 | Aimar . |
| 4,218,954 | * | 8/1980 | Morel . |
| 5,118,235 | * | 6/1992 | Dill . |

* cited by examiner

Primary Examiner—Flemming Saether
(74) Attorney, Agent, or Firm—Sidley Austin Brown & Wood, LLP

(57) ABSTRACT

A fastening element for attaching plate-shaped boards, and including a large-surface clamping member (2;22) with a hollow-stem (3;23) projecting from opening in the clamping member (2,22) with a hollow stem (3;23) projecting from and having a bore (5;25) opening in the clamping member (2;22) for receiving an expansion member (14) for an anchoring member (4;14); and a plug-shaped member (9;29) attached to the clamping member (2;22) with a strap (8;28) for closing the bore and having a plug-in section (11) with a sealing surface (12;32) sealing by cooperating with the bore wall and is force-lockingly retained therein, with the plug-in section (11;31) having at least one recess (13;33) provided with an undercut and a largest diameter of which corresponds to a diameter of a stem (15) of the expansion member (14) for enabling the closing member (9;29) to eclipse the shaft (15) of the expansion member (14).

10 Claims, 2 Drawing Sheets

FASTENING ELEMENT FOR ATTACHING INSULATION BOARDS

BACKGROUND OF THE INVENTION

1. Field of the Invention

The present invention relates to a fastening element for attaching plate-shaped boards and including a large-surface clamping member, a hollow stem projecting from the clamping member and having a bore opening at the clamping member for receiving an expansion member for an anchoring member with which a plate-shaped board is secured to a constructional component, and a shaped member attached to the clamping member with a strap for closing the bore by being inserted therein.

2. Description of the Prior Art

Insulation materials, in particular, insulation boards are used for heat insulation and partially also for noise insulation of walls and ceilings. Conventionally, the insulation boards are secured to a raw masonry. For securing the plate-shaped insulation materials, fastening elements, which have a large-surface, flat clamping plate from which a stem projects, are used. The stem extends into the insulation board. The fastening element is secured to the masonry primarily with a dowel-like or nail-like anchoring member that forms an extension of the stem. The dowel-like anchoring member is inserted in a pre-drilled bore formed in the masonry and in anchored in the masonry bore by being expanded. A nail-like anchoring member is directly driven into the masonry, without preliminarily forming a bore in the masonry. A bore formed in the stem and opening into the clamping member insures access for an expansion screw or a similar expansion member used for expanding the dowel-like member or to a nail-like member. After the masonry is covered with the insulation material plaster is applied.

German Utility Model DE-U-91 03 388 discloses a fastening element of a type described above for securing a plate-shape insulation material to a masonry and in which a closing member is provided for the bore accessible from the clamping plate. The closing member prevents penetration of the plaster into the bore. The closing member may have different forms, e.g., the closing member can be formed as a plug-like member that, after being form-lockingly inserted in an annular groove, is retained on the bottom of the bore. The drawback of the fastening element disclosed in the German Utility Model consists in that the bore is not sealingly closed. Therefore, a complete seal is not provided which can result in heat losses and in discoloration of the plaster. An expansion screw or an expansion nail-like member, with such fastening element, is not adequately protected from moisture. The closing member is connected with the clamping plate by a thin strap. During mounting, often, the closing member is in the way and need be kept by a worker away from the bore. During mounting, a large number of fastening elements need be kept in a box, and the closing members, which are connected to respective clamping plates by straps, can interlock with each other or with the clamping plates. Upon placing the boxes in a transporting receptacle or during the removal of the fastening elements, the straps can be torn. As a result, some of the fastening elements would remain without the closing members, and respective bores could not be closed.

Accordingly, an object of the present invention is to eliminate the drawbacks of fastening elements of the prior art.

Another object of the present invention is to provided a fastening element that can be easily handled and accessed.

A further object of the present invention is to provide a fastening element in which the opening in the clamping plate can be sealingly closed so that a vapor barrier is provided, and the penetration of moisture into the bore is prevented.

A still further object of the present invention is to provide a fastening element which would insure an easy handling of the closing member.

Also, an object of the present invention is to provide a fastening element in which interlocking of the closing member with the clamping plate or member and the separation of the closing member therefrom is prevented.

SUMMARY OF THE INVENTION

These and other objects of the present invention, which will become apparent hereinafter, are achieved by providing a fastening element including a large-surface clamping member, a hollow stem projecting from the clamping member and having a bore opening in the clamping member. The hollow stem is designed for receiving an expansion member for an anchoring member which is coaxial with the hollow stem and with which a plate-shaped board is secured to a constructional component. The bore is closed with a plug-shaped member which is attached to the clamping member with a strap and which closes the bore by being inserted therein. The closing member has a plug-in section having a sealing surface which, in its inserted condition, sealingly cooperates with a wall of the bore and is force-lockingly retained therein. The plug-in section has at least one recess provided with an undercut and a largest diameter of which corresponds to a diameter of a stem of the expansion member for enabling the closing member to eclipse the stem of the expansion member.

The cylindrical sealing surface of the plug-in section of the closing member, which cooperates with the bore wall, insures a sealing of the bore from outside. Thereby, an effective vapor barrier is provided and penetration of moisture into the bore is prevented. This permits the use of the fastening elements with an expansion member which is not formed of stainless steel and does not have a corrosion-resistant coating. Because the plug-in section has at least one undercut recess, the closing member eclipses the stem of the expansion member already during the pre-assembly of the fastening assembly. Due to the fact that the closing member occupies a precisely defined position, interlocking and separation of the closing member does not take place anymore. The handling of the fastening element is facilitated because during the assembly, the closing member need not be removed from the mouth opening of the bore in the clamping member.

In order to insure an easy eclipse of the stem of the expansion member and an adequate retention of the closing member on the stem of the expansion member, while permitting an easy release of the closing member, advantageously, the recess has an arcuate shape a circumferential profile of which extends over an angle from about 185° to about 330°.

Independent of the shape of the recess proper in the plug-in section, the undercut depth is preferably amounts from about 10% to about 45° of the largest width of the recess.

In order to insure a good and acceptable sealing function of the closing member, a portion of the plug-in section carrying the sealing surface is adjoined by a conical entrance region inclined with respect to the axial extension of the plug-in section at an angle from about 5° to about 30°.

For manufacturing reasons and in order to reduce consumption of materials, the plug-in section is formed as a tubular section. The fastening element is usually made of a plastic material and is produced by an injection-molding process. In order to be able to easily remove the core during the formation of the tubular plug-in section with a conical entrance region, the conical entrance region is provided with axially extending slots.

To facilitate the eclipsing of the stem of the expansion member by the closing member, the plug-in section is provided with two undercut recesses which are arranged diametrically opposite each other.

Because the expansion member has a countersunk head the surface of which is inclined to the stem of the expansion member and forms therewith an angle amounting to from about 105° to about 170°, the closing member is automatically released off the stem upon the expansion member being driven in the bore of the hollow stem. The available conical entrance region of the plug-in section provides for an automatic alignment of the closing member with the mouth opening of the bore. For closing the bore, the closing member simply need be inserted thereinto.

In a preferred embodiment of the fastening element according to the present invention, the anchoring member is formed as a dowel and the expansion member is formed as an expansion screw, in particular, as a screw with a countersunk head.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
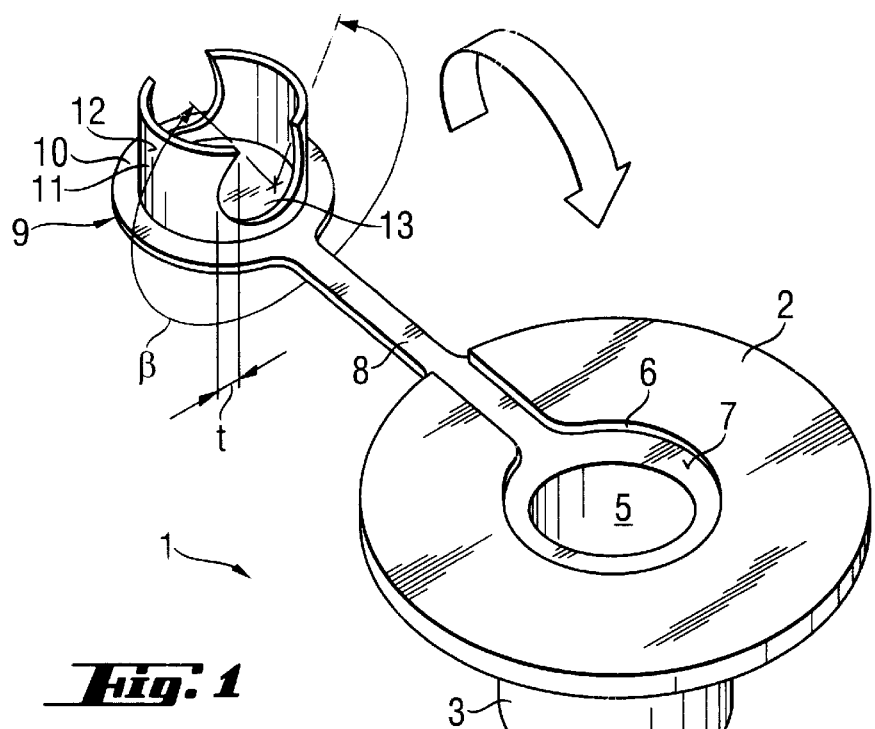
FIG. 1 A perspective view of a first embodiment of a fastening element according to the present invention.
Figure 2:
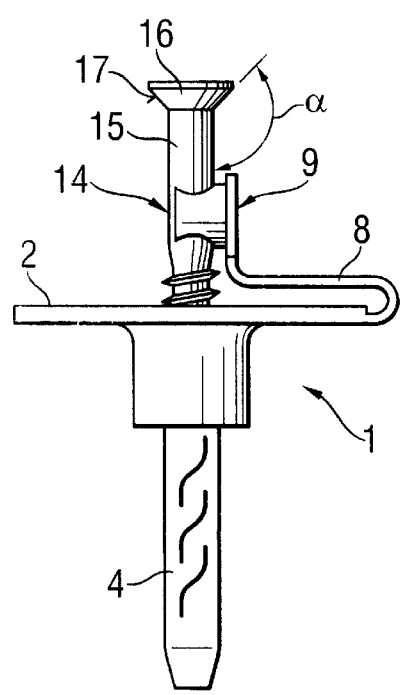
FIG. 2 A first side view of the fastening element shown in FIG. 1 illustrating the release function of the locking member.
Figure 3:
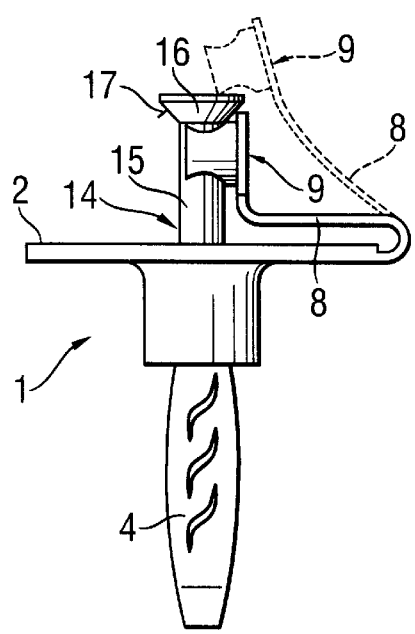
FIG. 3 A second side view of the fastening element shown in FIG. 1 illustrating the release function of the locking member.

A fastening element for plate-shape insulation boards such as, e.g., heat-insulating boards, which is shown in FIGS. 1–3, is generally designated with a reference numeral 1. The fastening element 1 has a large-surface, relatively thin, clamping member 2 with a hollow stem 3 projecting therefrom. An anchoring member 4 forms an extension of the hollow stem 3. As an anchoring member 4, e.g., a dowel can be used which is radially expandable by an expansion body, not shown, e.g., an expansion screw. The anchoring member 4 is inserted through the bore 5 of the hollow stem 3 which has an increased diameter in its mouth region 6 in the clamping member 2. A bearing surface 7 surrounds the increased diameter mouth of the bore 5.

A plug-like closing member 9 for the bore 5 is connected with the clamping member 2 by a strap 8. The closing member 9 has a tube-like plug-in section 11 projecting from a flange-like cover 10. The outer diameter of the cover 10 is equal to a slightly smaller than the diameter of the widened mouth region 6 of the bore 5. When the closing member 9 is inserted into the bore 5, the cover 10 is completely received in the mouth region 6 and is supported against the bearing surface 7. The wall thickness of the cover 10 is equal to or slightly smaller than the depth of the mouth region 6. This insures that with the closing member 9 being completely inserted, the cover 10 would not project above the bearing surface 7 of the clamping member 2.

The plug-in section 11 has a cylindrical sealing surface 12 which, in the inserted position of the closing member 9, cooperates with a wall of the bore 5. The outer diameter of the cylindrical sealing surface 12 is so selected that the locking member 9 is forcelockingly retained in the bore 5. In the embodiment shown in FIG. 1, two undercut recesses 13 are provided in the wall of the plug-in section 11. The recesses 13 are located diametrically opposite each other. The recesses 13 have an undercut depth which is defined as distance from the opening edge of the recess 13 to a location of the largest width of the recess 13 and which amounts from about 10% to about 45% of the largest width of the recess 13. Advantageously, the recesses 13 have a semi-circular form, as shown in FIG. 1. The circumferential profile of the semi-circular recess 13 extends over an angle β which amounts to from about 185° to about 330°. FIGS. 2 and 3 illustrate the function of the undercut recess 13 in the closing member 9. Due to the presence of the undercut recess 13, the locking member 9 eclipse the stem 15 of an expansion member 14, e.g., an expansion screw, already during a preliminary assembly or mounting. In this way, the locking member 9 is retained in a predetermined position. The strap, which connects the locking member 9 with the clamping member 2, is held at some prestress due to the retaining of the closing member 9 in the predetermined position. The expansion member 14 has a countersunk head 16, the surface 17 of which, inclined toward the stem 15, forms with the stem 15, an angle α that amounts from about 105° to about 170°. Upon the expansion screw 14 being screwed-in, the locking member 9 is displaced along the stem 15 in the direction toward the countersunk had 16 until it reaches the inclined surface 17 (as shown in FIG. 3). Upon further screw-in of the expansion member 14, the inclined surface 17 of the countersunk head 16 is displaced in the undercut recess 13, and the closing member 9 becomes disconnected, released, from the stem 15. The release position of the locking member 9 is shown in FIG. 3 with dash lines.

Figure 4:
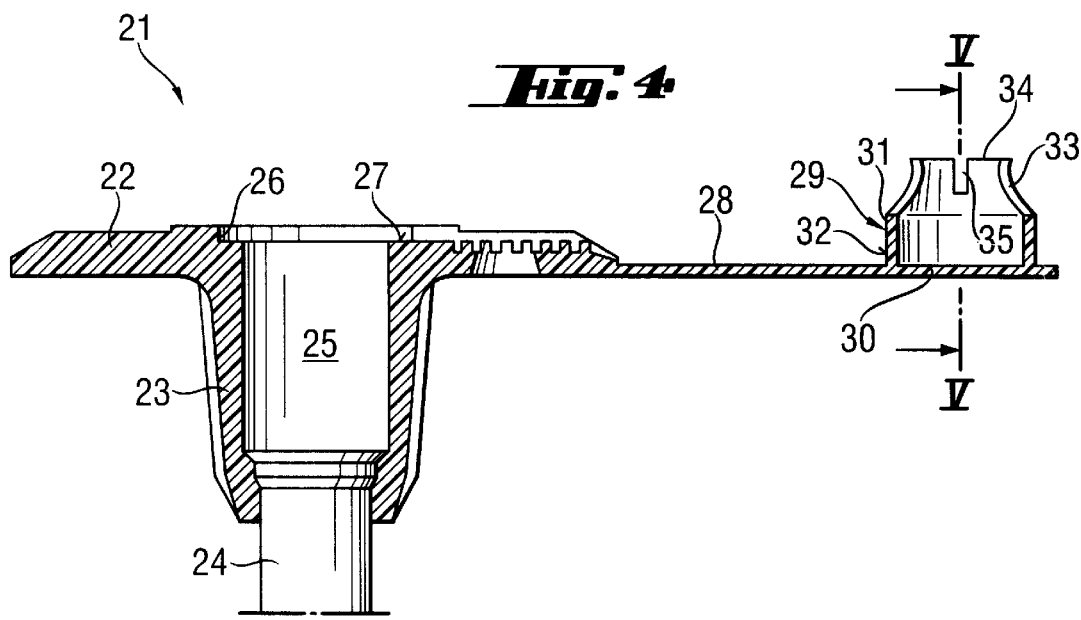
FIG. 4 A cross-sectional view of a second embodiment of the fastening element according to the present invention.

FIG. 4 shows a second embodiment of a fastening element according to the present invention for securing insulation boards. The fastening element shown in FIG. 4 is generally designated with a reference numeral 21. As the fastening element 1 shown in FIGS. 1–3, the fastening element 21 has a large-surface, flat clamping member 22 from which a hollow stem 23 projects. The anchoring member 24, e.g., an expansion dowel, is held in the hollow stem 23 and extends axially therein. The expansion member 24 is inserted through the bore 25 of the hollow stem 23. The bore 25 opens into the clamping member 22 and has a mouth region 26 which has an increased diameter and coincides with a bearing surface 27. A locking plug 29 is connected with the clamping member 22 by a strap 28. The closing plug 29 has a tube-like plug-in section 31 that projects from a flange-like cover 30 the diameter of which and the wall thickness of which corresponds to the dimensions of the mouth region 26 of the bore 25. A somewhat radially extending groove 36 is formed in the surface of the clamping member 22 and in which the strap 28 is received in the plug-in position of the closing member 29. A portion of the plug-in section 31 of the closing member 29 has a cylindrical sealing surface 32. A portion of the plug-in section 31 having the cylindrical sealing surface 32 is adjoined by an entrance region 34 the free end of which has a somewhat conically tapering portion. Two undercut recesses 33 are provided are formed in the plug-in section 31 of the locking member 29. The two recesses 33 are located diametrically opposite to each other. The conical entrance region 34 has slots 35 extending substantially in an axial direction, e.g., two, oppositely located, axial slots 35 can be formed in the conical entrance region 34.

Figure 5:
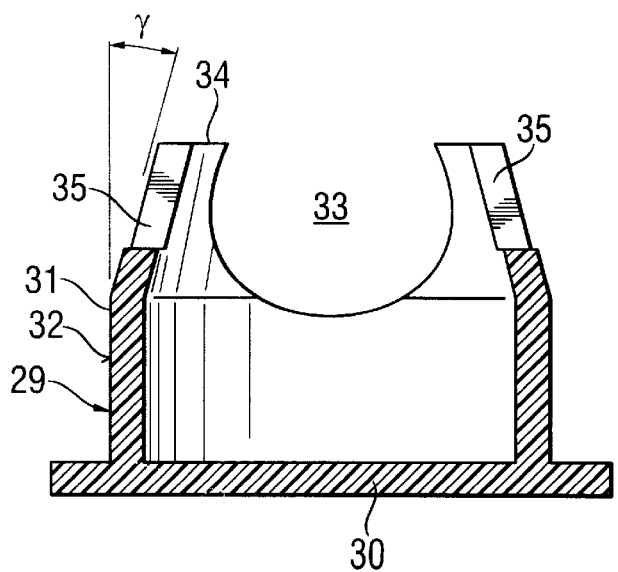
FIG. 5 A cross-sectional view of the locking member of the fastening element shown in FIG. 4 pivoted by 90°.

FIG. 5 shows a cross-sectional view of the closing plug 29 itself. As it has already been discussed with reference to FIG. 4, the closing plug 29 has a plug-in section 31 with two undercut recesses 33 and two axial slots 35, with the slots 35 following, in the circumferential direction, respective recesses 33. The recesses 33 and the slots 35 are so arranged that an angular distance between a center of a recess 33 and an adjacent, in the circumferential direction, slot 35 amount to about 90°. The conical entrance region 34, which adjoins the cylindrical potion 32 of the plug-in section 31, forms, with an axial extension of the plug-in section 31, an angle γ that amounts from about 5° to about 30°. The selected inclination angle γ, together with the inclination angle of the inclination surface of a countersunk head of a screw, facilitate the release of the closing plug 29, which would eclipse the screw stem, upon screwing the screw in.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A fastening element for attaching a plate-shaped board to a constructional component to which the plate-shaped board is secured with an anchor having an anchoring member (4) and an expansion member (14) for expanding the anchoring member and including a stem (15) having a predetermined diameter, the fastening element comprising a large-surface clamping member (2;22); a hollow stem (3;23) projecting from the clamping member (2;22) and having a bore (5;25) opening on the clamping member (2;22) for receiving the expansion member (14) for the anchoring member (4) with which the plate-shaped board is to be secured to the constructional component; and a plug-shaped member (9;29) attached to the clamping member (2;22) with a strap (8;28) for closing the bore (5;25) by being inserted therein, the plug-shaped member (9;29) having a plug-in section (11) with a sealing surface (12;32) which, in an inserted condition thereof, sealingly cooperates with a wall of the bore (5;25) and is forcelockingly retained therein, the plug-in section (11;31) having at least one recess (13;33) provided with an undercut and a largest width of which is selected to correspond to the predetermined diameter of the expansion member (14) to insure that the closing member (9;29) eclipses the stem (15) upon attachment of the plate-shaped board to the constructional component.

2. A fastening element according to claim 1, wherein the at least one recess has an arcuate shape a circumferential profile of which extends over an angle (13) from about 185° to about 330°.

3. A fastening element according to claim 1, wherein the at least one recess (13;33) has an undercut depth (t) from about 10% to about 45% of the largest width of the recess (13;33).

4. A fastening element according to claim 1, wherein the sealing surface (12;32) extends over at least 50% of a total length of the plug-in section (11;31).

5. A fastening element according to claim 1, wherein the plug-in section (11;31) has a tubular shape.

6. A fastening element according to claim 5, wherein the conical entrance region has axially extending seals (35).

7. A fastening element according to claim 1, wherein the plug-in region (11;31) has diametrically opposite recesses (13;33).

8. A fastening element according to claim 1, wherein the plug-in section (31) has a comical entrance region adjoining the sealing surface (32) and inclined to an axial extension of the plug-in section (31) at a angle (γ) from about 5° to about 30°.

9. A fastening assembly for attaching a plate-shaped board to a constructional component, comprising a large surface clamping member (2;22); a hollow stem (3;23) projecting from the clamping member (2;22) and having a bore (5;25) opening on the clamping member (2;22); and anchor received in the bore (5;25) for securing the plate-shaped board to the constructional component and having an anchoring member (4) and an expansion member (14) having a stem (15); and a plug-shaper member (9;29) attached to the clamping member (2;22) with a strap (8;28) for closing the bore (5;25) by being inserted therein, the plug-shaped member (9;29) having a plug-in section (11) with a sealing surface (12;32) which, in an inserted condition thereof, sealingly cooperates with a wall of the bore (5;25) and is forcelockingly retained therein, the plug-in section (11,31) having at least one recess (13;33) provided with an undercut and a largest width of which is selected to correspond to a predetermined diameter of the expansion member stem (15) to enable the plug-in member (9;29) to eclipse the stem (15) upon attachment of the plate-shaped board to the constructional component, wherein the expansion member (14) has a countersunk head (16) having an inclining surface (17) forming with the stem (15) of the expansion member (14) an inclination angle (α) amounting from about 105° to about 170°.

10. A fastening assembly according to claim 9, wherein the anchoring member (4;24) is formed as a dowel sleeve, and the expansion member (14) is formed as an expansion screw.

* * * * *